USo11424079B2

(12) United States Patent
Chen et al.

(10) Patent No.: US 11,424,079 B2
(45) Date of Patent: Aug. 23, 2022

(54) WINDING TYPE CAPACITOR ASSEMBLY WITH ENHANCED STRUCTURAL STRENGTH AND METHOD OF MANUFACTURING THE SAME

(71) Applicant: APAQ TECHNOLOGY CO., LTD., Miaoli County (TW)

(72) Inventors: Ming-Tsung Chen, Changhua County (TW); Chung-Jui Su, Kaohsiung (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 184 days.

(21) Appl. No.: 16/399,440

(22) Filed: Apr. 30, 2019

(65) Prior Publication Data

US 2019/0341197 A1 Nov. 7, 2019

(30) Foreign Application Priority Data

May 2, 2018 (TW) ................................. 107114869

(51) Int. Cl.
*H01G 9/15* (2006.01)
*H01G 9/028* (2006.01)
*H01G 9/00* (2006.01)

(52) U.S. Cl.
CPC ........... *H01G 9/151* (2013.01); *H01G 9/0036* (2013.01); *H01G 9/028* (2013.01)

(58) Field of Classification Search
CPC ..... H01G 9/0032; H01G 9/0036; H01G 9/151
See application file for complete search history.

(56) References Cited

U.S. PATENT DOCUMENTS

| | | | | |
|---|---|---|---|---|
| 6,519,137 | B1* | 2/2003 | Nitta ...................... | H01G 9/025 361/525 |
| 2010/0073850 | A1* | 3/2010 | Fujimoto ............... | H01G 11/56 361/530 |
| 2010/0193745 | A1* | 8/2010 | Harada ................ | H01G 9/0036 252/500 |
| 2011/0000527 | A1* | 1/2011 | Saito .................... | H01G 9/2004 136/252 |
| 2012/0212880 | A1* | 8/2012 | Ishimaru ................ | H01G 9/048 361/530 |

(Continued)

FOREIGN PATENT DOCUMENTS

JP 2003100561 A * 4/2003 ............. H01G 11/48

*Primary Examiner* — David M Sinclair
(74) *Attorney, Agent, or Firm* — Li & Cai Intellectual Property (USA) Office

(57) ABSTRACT

A winding type capacitor assembly with enhanced structural strength and a manufacturing method thereof are provided. The winding type capacitor assembly includes a positive conductive foil, a negative conductive foil, and at least one isolation element. The isolation element is disposed between the positive conductive foil and the negative conductive foil. A conductive polymer dispersed sol and an electrolyte filler are disposed between the positive conductive foil, the negative conductive foil, and the isolation element. The electrolyte filler is at least one selected from one of a conductive composition synthesized by a chemical polymerization method and a resin-blended conductive particle. The winding type capacitor assembly has enhanced structural strength through the use of the electrolyte filler.

8 Claims, 4 Drawing Sheets

(56) References Cited

U.S. PATENT DOCUMENTS

| | | | |
|---|---|---|---|
| 2013/0059064 A1* | 3/2013 | Majima | H01G 11/56 427/80 |
| 2020/0082994 A1* | 3/2020 | Fukui | H01G 9/0036 |
| 2020/0280091 A1* | 9/2020 | Christensen | H01M 4/624 |

* cited by examiner

WINDING TYPE CAPACITOR ASSEMBLY WITH ENHANCED STRUCTURAL STRENGTH AND METHOD OF MANUFACTURING THE SAME

CROSS-REFERENCE TO RELATED PATENT APPLICATION

This application claims the benefit of priority to Taiwan Patent Application No. 107114869, filed on May 2, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a winding type capacitor assembly and a method of manufacturing the same, and more particularly to a winding type capacitor assembly with enhanced structural strength and a method of manufacturing the same.

BACKGROUND OF THE DISCLOSURE

Capacitors have been widely used in consumer appliances, computer motherboards and their peripherals, power supplies, communication products, and automotive basic components and are considered one of the indispensable components in electronic products. Capacitors' main functions include: filtering, bypassing, rectification, coupling, decoupling, and (phase) shifting Capacitors are available in different types depending on materials and applications, including aluminum electrolytic capacitors, tantalum electrolytic capacitors, multilayer ceramic capacitors, and film capacitors. Conventional solid electrolytic capacitors have the advantages of small size, large capacitance, superior frequency characteristics, and the like, and can decouple the power supply circuit for the central processing unit. Conventional solid electrolytic capacitors use solid electrolytes instead of liquid electrolytes as cathodes, and conductive polymers have been widely used as cathode materials for solid electrolytic capacitors based on their high electrical conductivity and being easy to make.

However, the conventional solid electrolytic capacitors still have disadvantages to be improved. For example, the solid electrolyte of the existing dispersion system has a lower solid content, so that a solid electrolytic capacitor product using the existing dispersion system has the disadvantage of having a loose structure and being easily deformed by external force.

SUMMARY OF THE DISCLOSURE

In response to the above-referenced technical inadequacies, the present disclosure provides a winding type capacitor assembly with enhanced structural strength and a method of manufacturing the same, which can effectively improve the structural strength of the capacitor package structure, and even improve the electrical characteristics of capacitor products.

In one aspect, the present disclosure provides a winding type capacitor assembly with enhanced structural strength, which includes a positive conductive foil, a negative conductive foil, and at least one isolation element. The isolation element is disposed between the positive conductive foil and the negative conductive foil. A conductive polymer dispersed sol and an electrolyte filler are disposed between the positive conductive foil, the negative conductive foil, and the isolation element. The electrolyte filler is selected from at least one of a conductive composition synthesized by a chemical polymerization method and a resin-blended conductive particle.

In one aspect, the present disclosure provides a manufacturing method of a winding type capacitor assembly with enhanced structural strength, and the winding type capacitor assembly includes a positive conductive foil, a negative conductive foil, and at least one isolation element disposed between the positive conductive foil and the negative conductive foil. The manufacturing method includes disposing a conductive polymer dispersed sol between the positive conductive foil, the negative conductive foil, and the isolation element of the winding assembly, and filling an electrolyte filler between the positive conductive foil, the negative conductive foil, and the isolation element. The electrolyte filler is selected from at least one of a conductive composition synthesized by a chemical polymerization method and a resin-blended conductive particle.

Therefore, the winding type capacitor assembly with enhanced structural strength and the method of manufacturing the same of the present disclosure has the technical features of "a conductive polymer dispersed sol and a electrolyte filler being disposed between the positive conductive foil, the negative conductive foil, and the isolation element," "disposing one conductive polymer dispersed sol between the positive conductive foil, the negative conductive foil, and the isolation element of the winding assembly" and "filling an electrolyte filler between the positive conductive foil, the negative conductive foil, and the isolation element," so as to improve the overall structural strength and the electrical characteristics of the winding type capacitor assembly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
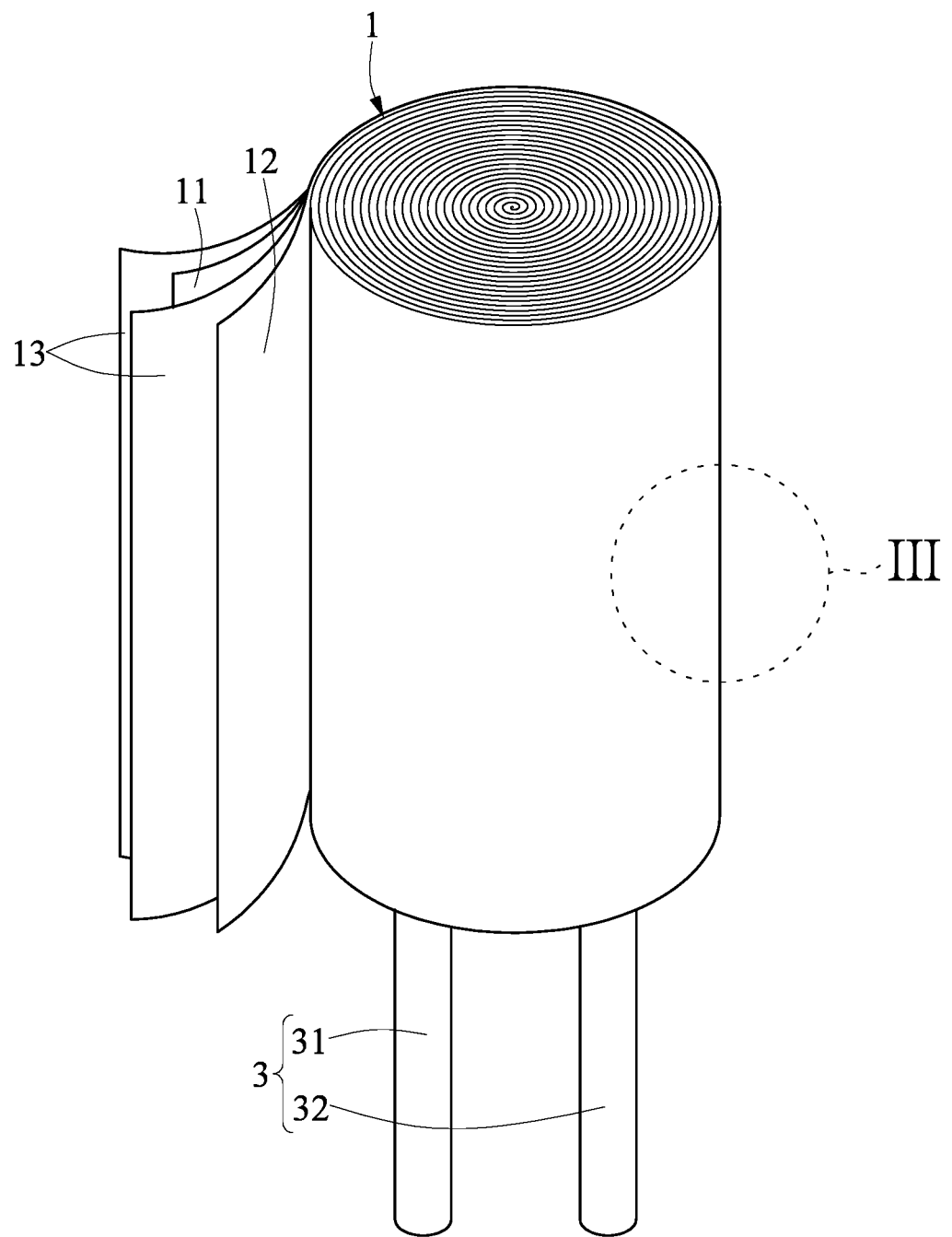
FIG. 1 is a side cross-sectional view of a winding type capacitor assembly with enhanced structural strength and a conductive assembly according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
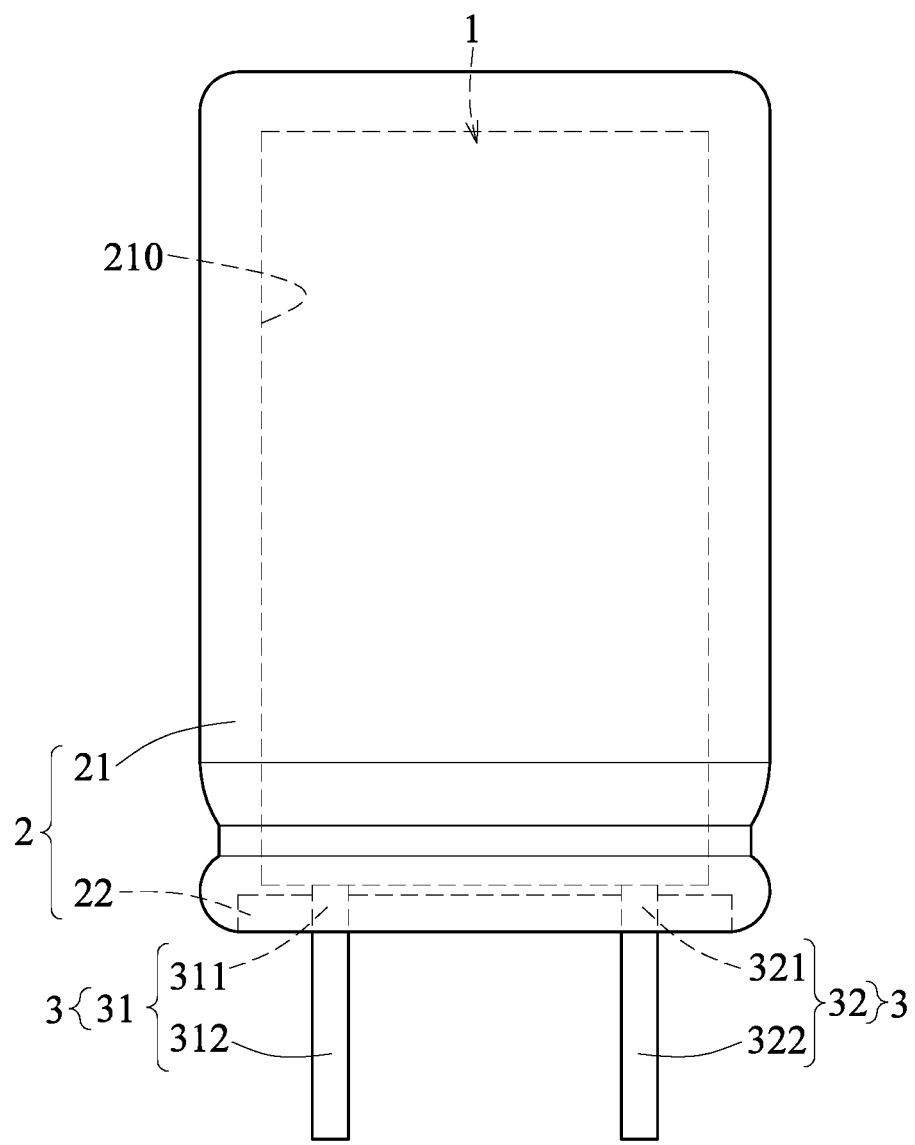
FIG. 2 is a side cross-sectional view of a winding type capacitor assembly with enhanced structural strength and a capacitor package structure according to an embodiment of the present disclosure.

Referring to FIG. 1 to FIG. 2, FIG. 1 is a side cross-sectional view of a winding type capacitor assembly with enhanced structural strength and a conductive assembly according to an embodiment of the present disclosure, and FIG. 2 is a side cross-sectional view of a winding type capacitor assembly with enhanced structural strength and a capacitor package structure according to the embodiment of the present disclosure.

As shown in FIG. 1, a winding type capacitor assembly 1 includes a positive conductive foil 11, a negative conductive foil 12, and an isolation element 13. Further, the isolation element 13 is disposed between the positive conductive foil 11 and the negative conductive foil 12. In addition, FIG. 1 also shows another isolation element 13, and one of the positive conductive foil 11 and the negative conductive foil 12 is disposed between the two isolation elements 13. Furthermore, the winding type capacitor assembly 1 is electrically connected to the conductive assembly 3.

The conductive assembly 3 includes a first conductive pin 31 that electrically contacts the positive conductive foil 11 and a second conductive pin 32 that electrically contacts the negative conductive foil 12. For example, the first conductive pin 31 has a first embedded portion 311 that is embedded inside the package assembly 2 and a first exposed portion 312 that is exposed outside the package assembly 2, and the second conductive pin 32 has a second embedded portion 321 that is embedded inside the package assembly 2 and a second exposed portion 322 that is exposed outside the package assembly 2.

As shown in FIG. 2, the winding type capacitor assembly 1 can be packaged to form a winding solid electrolytic capacitor package structure P. The winding type solid electrolytic capacitor package structure P includes: the winding type capacitor assembly 1, the package assembly 2, and the conductive assembly 3. After the packaging step, the winding type capacitor assembly 1 is embedded inside the package assembly 2. For example, the package assembly 2 includes a housing structure 21 (such as an aluminum shell or other metal housing) and a bottom enclosing structure 22, the housing structure 21 has an accommodating space 210 for housing the winding type capacitor assembly 1, and the bottom enclosing structure 22 is disposed at the bottom end of the capacitor housing structure 21 to close the accommodating space 210. In addition, the package assembly 2 can also be a package made of any insulating material.

Referring to FIG. 1 again, the positive conductive foil 11 and the negative conductive foil 12 of the winding type capacitor assembly 1 may include titanium (Ti) or carbon (C). In addition, a solid electrolyte is filled between the positive conductive foil 11, the negative conductive foil 12, and the isolation element 13. Specifically, the solid electrolyte may be disposed on the surface and/or inside of the winding type capacitor assembly 1 and percolate into the surface micro holes of the winding type capacitor assembly 1.

In detail, in the winding type capacitor assembly with enhanced structural strength provided by the present disclosure, the positive conductive foil 11, the negative conductive foil 12, and the isolation element 13 are disposed with a conductive polymer dispersed sol and an electrolyte filler, and the conductive polymer dispersed sol and the electrolyte filler together form a solid electrolyte.

Figure 3:
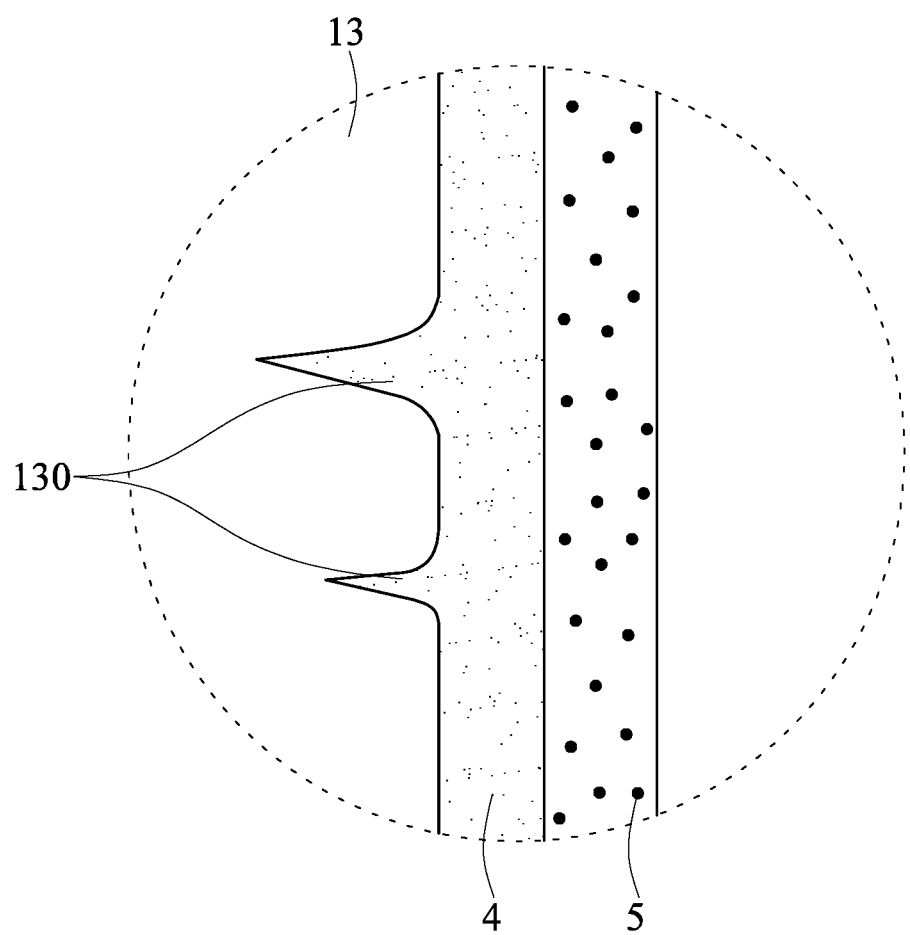
FIG. 3 is an enlarged schematic view of a portion III of FIG. 1.

Referring to FIG. 3, FIG. 3 is an enlarged schematic view of a section III of FIG. 1. Specifically, the conductive polymer dispersed sol and the electrolyte filler cooperate to form a composite solid electrolyte so that the adjacent positive conductive foil 11, the negative conductive foil 12, and the isolation element 13 are mesh-connected to each other.

In the conventional art, a solid electrolytic capacitor is a solid electrolyte using only conductive polymer dispersed sol as a capacitor. Specifically, the conductive polymer dispersed sol disposed between the positive conductive foil 11, the negative conductive foil 12, and the isolation element 13 can pass through or percolate into pores of the electrolytic paper so as to form a filamentary electrical connection between the positive conductive foil 11 and the negative conductive foil 12.

However, since the conductive polymer dispersed sol has a low solid content and the filamentous electrical joint strength of the conductive polymer dispersed sol is not satisfactory, the structure of the capacitor element including the conductive polymer dispersed sol, or the structure of the capacitor package structure including the capacitor element is loose. Therefore, conductive polymer dispersed sol is prone to be deformed when being subjected to force. As such, the step of coating (disposing) a conductive polymer dispersed sol-layer 4 is required so as to achieve sufficient electrical connection and structural strength.

In view of the above, in the present disclosure, the strength of the electrical connection between the positive conductive foil 11 and the negative conductive foil 12 is enhanced by the electrolyte filler having a high solid content, and the capacitor element or the overall structural strength of the capsule package structure is improved.

For example, in the embodiment of the disclosure, the conductive polymer dispersed sol has a solid content of between 20% and 30% and the electrolyte filler has a solid content of between 60% and 70%. Therefore, by using a conductive polymer dispersed sol having a low solid content which can easily percolate into the micro pores of the capacitor element, and an electrolyte filler having a high solid content, the winding type capacitor assembly provided by the present disclosure includes a composite solid electrolyte which can have improved structural strength and electrical properties.

Specifically, in an embodiment of the present disclosure, a portion of the conductive polymer dispersed sol dips into a plurality of micro holes 130 of at least one of the positive conductive foil 11, the negative conductive foil 12, and the isolation element 13, and another portion of the conductive polymer dispersed sol is coated on the positive conductive foil, the negative conductive foil, and the isolation element to form the conductive polymer dispersed sol-layer 4. As a portion of the conductive polymer dispersed sol percolates into the micro holes 130 formed during the process, the impregnation rate of the conductive polymer dispersed sol to the winding type capacitor assembly 1 can be increased.

The conductive polymer dispersed sol may include conductive polymer nanoparticles and a dispersing agent, and may be used in combination with one or more additives. For example, the conductive polymer nanoparticle is a nanometer-sized conductive polymer material, and may be an aniline, a polypyrrole, a polythiophene, a polydioxyethylthiophene-polystyrenesulfonic acid (PEDOT:PSS) composite or any combination of the above-mentioned. The dispersing agent can be water or other organic solvents such as alcohols. The additive may be selected from a conductive auxiliary agent, a pH adjuster, an aggregating agent, a thickener, an adhesive, and a crosslinking agent. In addition, conductive polymer nanoparticles can be modified by emulsifiers to improve their dispersibility and electrical properties.

In the present disclosure, the conductive polymer dispersed sol-layer formed in the winding solid capacitor assembly by the conductive polymer dispersed sol can be formed by different methods. The conductive polymer dispersed sol can be disposed in a winding type capacitor assembly by immersion coating, spin coating, curtain coating or spray coating. For example, the winding type capacitor assembly can be immersed in a container carrying a conductive polymer dispersed sol. Next, a winding type capacitor assembly provided with a conductive polymer dispersed sol is dried to remove residual dispersing agent. In this way, a conductive polymer dispersed sol-layer 4 can be formed between the positive conductive foil 11, the negative conductive foil 12 and the isolation element 13 of the winding type capacitor assembly.

Next, as previously mentioned, the electrolyte filler should be used with the conductive polymer dispersed sol to enhance the overall package strength and electrical properties of the capacitor package structure. In fact, if only the electrolyte filler is used as the solid electrolyte in the winding type capacitor assembly, the capacitor package structure made would have a higher leakage current (LC) effect. In general, in order to improve on the issue associated with the leakage current, it is necessary to balance the operating voltage with the withstand voltage of the positive conductive foil 11. However, overcoming the leakage current problem would also entail sacrificing the capacitance value of the capacitor As discovered, simultaneous use of conductive polymer dispersed sol and electrolyte filler as a composite solid electrolyte can overcome the disadvantages of using conductive polymer dispersed sol alone and the disadvantage of using electrolyte filler alone. As described above, after the conductive polymer dispersed sol-layer 4 is formed, the electrolyte filler may be filled in a gap between the conductive polymer dispersed sol-layer 4 and the positive conductive foil 11, the negative conductive foil 12, and the isolation element 13. Therefore, the filament-shaped electrical connection originally formed of the conductive polymer dispersed sol can be converted into a network, a planar shaped, and a high-density electrical connection.

For example, in the present disclosure, the electrolyte filler is selected from at least one of a conductive composition synthesized by a chemical polymerization method and a resin-blended conductive particle. The conductive polymer synthesized by the chemical polymerization method may be derived from at least two conductive polymer monomers, an oxidizing agent, and an auxiliary. For example, the conductive polymer monomer can be 3,4-dioxyethylthiophene (EDOT) and polystyrenesulfonic acid (PSS), and the oxidizing agent can be sodium persulfate. Alternatively, the auxiliary may be hydroquinone.

As the electrolyte filler used in the present disclosure, the conductive composition synthesized by the chemical polymerization method and the conductive polymer dispersed sol-layer 4 may be formed by the same composition. However, it should be noted that in order to achieve the effect of strengthening the structure of the capacitor by the electrolyte filler, the ratio of the different components in the conductive composition as the electrolyte filler needs to be adjusted. For example, in an embodiment of the present disclosure, the molar ratio of the at least two conductive polymer monomers, the oxidizing agent, and the auxiliary agent is 1:0.7 to 1.4:0.5 to 2. In one embodiment, a total of 1 mole of EDOT and PSS may be adopted as the conductive polymer monomer, 0.7 moles of sodium persulfate be adopted as the oxidizing agent, and 0.8 moles of hydroquinone be adopted as the auxiliary.

As mentioned above, the dielectric filler can also be a resin blended conductive particle. The resin-blended conductive particles include a resin material and metal composite conductive particles. For example, the resin material in the resin-blended conductive particles may be at least one of an epoxy resin, an acrylic resin, and a methacrylic resin, and the metal composite conductive particles may be composite particles of copper (Cu) and silver (Ag). In addition, the resin-blended conductive particles may be used in combination with an additive such as a dispersing agent to improve the dispersibilities of the resin material and the metal composite conductive particles.

In an embodiment of the present disclosure, the content of the resin material in the resin-blended conductive particles is between 90 and 98 mol %, the content of the metal composite conductive particles is between 0.2 and 0.8 mol %, and the resin-blended conductive particles further include the margin of additives.

The method of which the electrolyte filler is disposed between the positive conductive foil 11, the negative conductive foil 12, and the isolation element 13 can be adjusted depending on the kind of the electrolyte filler. For example, the electrolyte filler may be disposed in the winding type capacitor assembly 1 by immersion coating, spin coating, curtain coating or spray coating to form a filled layer 5.

Figure 4:
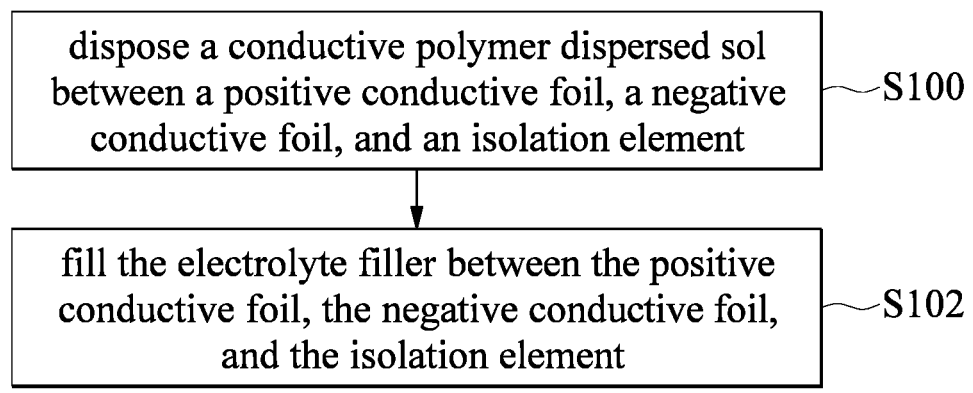
FIG. 4 is a flow chart of a manufacturing method of a winding type capacitor assembly with enhanced structural strength according to an embodiment of the present disclosure.

Next, referring to FIG. 4, the present disclosure also provides a manufacturing method of a winding type capacitor assembly with enhanced structural strength. The above manufacturing method is for manufacturing the winding type capacitor assembly 1 previously described. As shown in FIG. 4, the manufacturing method of winding type capacitor assembly with enhanced structural strength provided by the present disclosure includes: disposing a conductive polymer dispersed sol between a positive conductive foil, a negative conductive foil, and an isolation element (step S100), and filling the electrolyte filler between the positive conductive foil, the negative conductive foil, and the isolation element (step S102).

Through the above steps, the conductive polymer dispersed sol and the electrolyte filler can be combined to form a composite solid electrolyte, so that the adjacent positive conductive foil 11, the negative conductive foil 12 and the isolation element 13 are mesh-connected to each other.

polymer dispersed sol, and water is used as a solvent for the conductive polymer dispersed sol. Next, the results of the relevant electrical characteristics test using the different electrolyte fillers to form the filled layer 4 and the capacitor package structure are listed in the table below. Specifically, in Table 1, the conductive composition synthesized by the chemical polymerization method is used as the electrolyte filler, and in Table 2, the conductive particles are mixed with the resin as the electrolyte filler.

It is worth mentioning that in the following table, 3,4-ethylenedioxythiophene (EDOT) and polystyrene sulfonate (PSS, poly(styrenesulfonate)) are used as monomers, iron toluenesulfonate is used as an oxidizing agent, imidazole is used as an auxiliary agent, epoxy resin is used as a resin material, copper-silver (Cu—Ag) composite particles are used as conductive particles, and a dispersing agent is used as an additive. The dispersing agent is a long carbon chain alcohol having a branch and has an unsaturated bond (such as a triple bond) therein.

TABLE 1

|  | Monomer (mole) | Oxidizing agent (mole) | Additive (mole) | Capacitance (μf) | Leakage current (μa) | Capacitor ESR (mω) | Open circuit (each ten) | Short circuit (each ten) |
|---|---|---|---|---|---|---|---|---|
| Example 1 | 1 | 0.9 | 0.9 | 50 | 12 | 20 | 0 | 0 |
| Example 2 | 1 | 0.8 | 1 | 52 | 8 | 19 | 0 | 0 |

TABLE 2

|  | Monomer (mole) | Oxidizing agent (mole) | Additive (mole) | Capacitance (μf) | Leakage current (μa) | Capacitor ESR (mω) | Open circuit (each ten) | Short circuit (each ten) |
|---|---|---|---|---|---|---|---|---|
| Example 1 | 1 | 0.9 | 0.9 | 50 | 12 | 20 | 0 | 0 |
| Example 2 | 1 | 0.8 | 1 | 52 | 8 | 19 | 0 | 0 |

It should be noted that, the structure or specific kind and reaction ratio of the winding type capacitor assembly, the conductive polymer dispersed sol and the electrolyte filler used in the manufacturing method provided by the present disclosure have been previously described in the description of the winding type capacitor assembly with enhanced structural strength, and will not be repeated herein.

In the embodiment of the present disclosure, the step of disposing the conductive polymer dispersed sol (step S100), further includes: having a portion of the conductive polymer dispersed sol to dip into at least one of the positive conductive foil, the negative conductive foil, and the isolation element; forming a conductive polymer dispersed sol-layer 4 by coating another portion of the conductive polymer dispersed sol on a positive conductive foil, a negative conductive foil, and an isolation element.

The winding type capacitor assembly with enhanced structural strength and the method of manufacturing the same provided by the present disclosure will be exemplified below.

In the following examples, the PEDOT:PSS composite is used as the conductive polymer material in the conductive It can be seen from the above Table 1 and Table 2 that with the use of the conductive polymer dispersed sol to form the conductive polymer dispersed sol-layer 4 and the use of the electrolyte filler to form the filled layer 5 as the solid electrolyte, the wound solid electrolytic capacitor package structure P can have excellent electrical characteristics.

In conclusion, the winding type capacitor assembly with enhanced structural strength and the method of manufacturing the same of the present disclosure has the technical features of "one conductive polymer dispersed sol and one electrolyte filler being disposed between the positive conductive foil, the negative conductive foil, and the isolation element," "disposing one conductive polymer dispersed sol between the positive conductive foil, the negative conductive foil, and the isolation element of the winding assembly" and "filling an electrolyte filler between the positive conductive foil, the negative conductive foil, and the isolation element," so as to improve the overall structural strength and the electrical characteristics of the winding type capacitor assembly.

Specifically, by using the conductive polymer dispersed sol and the electrolyte filler as the composite solid electrolyte in the winding type capacitor assembly, a mesh-like solid bond with good conductivity (low resistance) and strong support can be established between the positive conductive foil 111, the negative conductive foil 12, and the isolation element 13. As a result, the winding type capacitor assembly 1 with enhanced structural strength provided by the present disclosure can be applied to a high voltage, small size capacitor product and have excellent electrical characteristics.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A winding type capacitor assembly with enhanced structural strength, comprising:
    a positive conductive foil;
    a negative conductive foil; and
    at least one isolation element disposed between the positive conductive foil and the negative conductive foil;
    wherein a conductive polymer dispersed sol and an electrolyte filler are disposed between the positive conductive foil, the negative conductive foil and the isolation element;
    wherein the electrolyte filler is a plurality of resin-blended conductive particles;
    wherein the conductive polymer dispersed sol and the electrolyte filler cooperate to form a composite solid electrolyte having a network structure, so that the positive conductive foil, the negative conductive foil, and the isolation element are electrically mesh-connected to each other by the composite solid electrolyte;
    wherein the conductive polymer dispersed sol has a solid content of between 20% and 30%, and the electrolyte fill has a solid content of between 60% and 70%;
    wherein each of the resin-blended conductive particles includes a resin material and a metal composite conductive particle, and the metal composite conductive particle is a copper-silver (Cu—Ag) composite particle.

2. The winding type capacitor assembly with enhanced structural strength according to claim 1, wherein a portion of the conductive polymer dispersed sol percolates into a plurality of micro holes of at least one of the positive conductive foil, the negative conductive foil, and the isolation element, and another portion of the conductive polymer dispersed sol is coated on the positive conductive foil, the negative conductive foil, and the isolation element to form a conductive polymer dispersed sol-layer.

3. The winding type capacitor assembly with enhanced structural strength according to claim 1, wherein the content of the resin material is between 90 and 98 mol %, and the content of the metal composite conductive particle is between 0.2 and 0.8 mol %, and each of the resin-blended conductive particles further includes the margin of an additive, and the additive is selected from a conductive auxiliary agent, a pH adjuster, an aggregating agent, a thickener, an adhesive, and a crosslinking agent.

4. The winding type capacitor assembly with enhanced structural strength according to claim 1, wherein by using the conductive polymer dispersed sol having the solid content ranging from 20% to 30%, and the electrolyte filler having the solid content ranging from 60% to 70%, a structural strength and an electrical property of the composite solid electrolyte are improved.

5. A method of manufacturing a winding type capacitor assembly with enhanced structural strength, the winding type capacitor assembly comprising a positive conductive foil, a negative conductive foil, and at least one isolation element disposed between the positive conductive foil and the negative conductive foil, the manufacturing method comprises:
    disposing a conductive polymer dispersed sol between the positive conductive foil, the negative conductive foil, and the isolation element of the winding assembly; and
    filling an electrolyte filler between the positive conductive foil, the negative conductive foil, and the isolation element;
    wherein the electrolyte filler is a plurality of resin-blended conductive particles;
    wherein the conductive polymer dispersed sol and the electrolyte filler cooperate to form a composite solid electrolyte having a network structure, so that the positive conductive foil, the negative conductive foil, and the isolation element are electrically mesh-connected to each other by the composite solid electrolyte;
    wherein the conductive polymer dispersed sol has a solid content of between 20% and 30%, and the electrolyte filler has a solid content of between 60% and 70%;
    wherein each of the resin-blended conductive particles includes a resin material and a metal composite conductive particle, and the metal composite conductive particle is a copper-silver (Cu—Ag) composite particle.

6. The method of manufacturing the winding type capacitor assembly with enhanced structural strength according to claim 5, wherein in the step of disposing the conductive polymer dispersed sol, further including: having a portion of the conductive polymer dispersed sol to percolate into a plurality of micro holes of at least one of the positive conductive foil, the negative conductive foil, and the isolation element.

7. The method of manufacturing the winding type capacitor assembly with enhanced structural strength according to claim 5, wherein the content of the resin material is between 90 and 98 mol %, and the content of the metal composite conductive particle is between 0.2 and 0.8 mol %, and each of the resin-blended conductive particles further includes the margin of an additive, and the additive is selected from a conductive auxiliary agent, a pH adjuster, an aggregating agent, a thickener, an adhesive, and a crosslinking agent.

8. The method of manufacturing the winding type capacitor assembly with enhanced structural strength according to claim 5, wherein by using the conductive polymer dispersed sol having the solid content ranging from 20% to 30%, and the electrolyte filler having the solid content ranging from 60% to 70%, a structural strength and an electrical property of the composite solid electrolyte are improved.

* * * * *